United States Patent
Chung

[11] Patent Number: 6,125,380
[45] Date of Patent: Sep. 26, 2000

[54] DIVIDING METHOD

[75] Inventor: Chii-Jen Chung, Hsinchu, Taiwan

[73] Assignee: Winbond Electronics Corporation, Taiwan

[21] Appl. No.: 09/059,931

[22] Filed: Apr. 13, 1998

[51] Int. Cl.[7] .................................................. G06F 7/52
[52] U.S. Cl. ............................................ 708/650; 708/653
[58] Field of Search ............................ 708/650, 653–655

[56] References Cited

U.S. PATENT DOCUMENTS

| | | | |
|---|---|---|---|
| 4,761,758 | 8/1988 | Deczby et al. ........................ | 708/650 |
| 4,860,241 | 8/1989 | Haber .................................... | 708/650 |
| 4,891,780 | 1/1990 | Miyoshi ................................ | 708/655 |
| 5,027,309 | 6/1991 | Koumoto et al. ..................... | 708/655 |
| 5,317,531 | 5/1994 | Zaidi .................................... | 708/655 |
| 5,426,600 | 6/1995 | Nakagawa et al. ................... | 708/653 |
| 5,748,518 | 5/1998 | Jaggar .................................. | 708/653 |
| 5,754,460 | 5/1998 | Tan ....................................... | 708/655 |
| 5,815,423 | 9/1998 | Kim ...................................... | 708/655 |

*Primary Examiner*—Tan V. Mai
*Attorney, Agent, or Firm*—Trexler, Bushnell, Giangiorgi & Blackstone, Ltd.

[57] ABSTRACT

A method for dividing a dividend by a divisor and finding a dividing quotient and a dividing remainder is provided. The dividend has a low byte part and a high byte part and the divisor has a low byte part and a maximum digital value whose most significant bit is "1" and other bits are "0". At first, the low byte part of the dividend is divided by the divisor to obtain a low-byte quotient and a low-byte remainder. Secondly, the high byte part of the dividend is divided by the divisor to obtain a high-byte quotient and a high-byte remainder. Then the high-byte remainder is shift-divided by the divisor to update the low-byte quotient, the high-byte quotient, and the high-byte remainder. Then the high-byte remainder is added to the low-byte remainder to obtain a sum. The sum is divided by the divisor to obtain a quotient and the dividing remainder. Finally, the quotient is added to the low-byte quotient to find the dividing quotient.

20 Claims, 5 Drawing Sheets

DIVIDING METHOD

FIELD OF THE INVENTION

The present invention is related to a method for dividing a dividend having a high byte part and a low byte part by a divisor only having a low byte part and a maximum digital value, and especially to a method for dividing a 16-bit number by a 8-bit number in 8-bit microprocessor.

BACKGROUND OF THE INVENTION

A microprocessor consisting of a central process unit (CPU), an input-output port (I/O) and a memory is often adopted to be used for automatic control or signal processing. The microprocessors 8051 and 6811 are well-known 8-bit microprocessors. Although the internal structure of these kinds of 8-bit microprocessor (i.e. only providing a method for dividing a 8-bit dividend by a 8-bit divisor to obtain a 8-bit quotient and a 8-bit remainder) belongs to 8 bits, a long-bit (16 bits) division can be processed by using software programs.

Generally, a binary division can use a so-called shift-dividing method. For example, the steps for dividing 35 by 6 are described as follows:

First of all, to define the dividend, divisor, and quotient as follows:

dividend: 100011 quotient: 0 divisor: 110

Next, to compare the first 3 bits of the dividend 100 with the divisor 110. Since 100 is less than 110, i.e. it is not sufficient to be substracted, the quotient is leftwardly shifted one bit to be added '0' for obtaining a new quotient 00, but the dividend is leftwardly shifted one bit or the divisor is rightwardly shifted one bit for proceeding the next shift-dividing method. Now, the dividend, the divisor, and the quotient are as follows, dividend: 100011 quotient: 00 divisor: 0110

Because 110 is sufficient enough to be subtracted from 000 and is equal to 0010, the quotient is leftwardly shifted one bit and is added '1' into to obtain a new quotient 001. 1000 is replaced by the subtraction result 0010 for obtaining a new dividend 001011. After the divisor is rightwardly shifted one bit, the dividend, the divisor, and the quotient are become as follows:

dividend: 001011 quotient: 001 divisor: 00110

Similarly, 101 is less than 110 so that it is not enough to be subtracted. The quotient will be leftwardly shifted one bit to be added '0' for obtaining a new quotient 010, and the divisor will be rightwardly shifted one bit. So, the quotient, the divisor and the dividend are as follows:

dividend: 001011 quotient: 0010 divisor 000110

Finally, 1011 substrated from 110 is equal to 101. Because 1011 is not less than 110, the quotient will be leftwardly shifted one bit to be added '1' for obtaining a new quotient 00101 and the the partial dividend 1011 will be replaced by 0101. The last dividend is the last remainder. That is, 35 is divided by 6 to obtain the remainder 000101 (5) and the quotient 00101 (5). The results are described as follows:

remainder: 000101 quotient: 00101 divisor 000110

According to the above description, the binary division is quite regular and the method for dividing 16-bit number by 8-bit number may operated by taking advantage of a software program.

Now, 8051 is used as an example. Since 8051 is a 8-bit microprocessor which only provides 8-bit division, a software program should be used for dividing 16-bit number by 8-bit number. Because each of 8051 registers is belonged to 8-bit, the 16-bit number must be stored in two registers. Here, a 16-bit digital data means a long bit digital data and a 8-bit digital data is a short bit digital data.

As shown in FIG. 1, 8051 microprocessor include a register set 18 and a flag set 19. In the register set 18, registers R0, R1, R2, R3, R4, R5, R6, R7 are usually used for data storage, the register A is a accumulator and often used for arithmetical and logical operation, and the rigister B is usually used for counting. In the flag set 19, bit C is a carry flag for shifting a register or adjudging arithmetical carry. The control program of the microprocessor is usually completed by Assembly Language. Registers, flags and instructions are used in the program of 8051 microprocessor to work.

As shown in FIG. 2 which is a flow chart showing the principle of the conventional division for a 8-bit microprocessor such as 8051 microprocessor.

Step 1: The high byte part of the dividend is stored in the rigister R1 and the low byte part of the dividend is stored in the rigister R2. A 16-bit digital number is divided by a 8-bit digital number to obtain the quotient (its maximum number is 16 bits) stored in the register R1 and R0. On the other hand, the maxmium bits of the remainder do not exceed 8 bits such that it is just stored in the register R6.

Step 2: Next, proceed initialization. The initial value of R6 is set on zero, and the counting value stored in the register B is set on 16 because there are 16 times of shifting action for 16-bit dividend.

Step 3: The Carry flag C must be clear befor executing the shifting action.

Step 4: The registers R1 and R0 are shifted one bit to the carry flag C.

Step 5: The register R1 is leftwardly and circularly shifted one bit into the register R6 by way of the carry flag C.

Step 6: Clear the carry flag C when the shifting action is completed.

Step 7: Compare the the register R6 and the register R2. If the value stored in the register R6 is smaller than the value stored in the register R2, step 10 will be executed to down count the counting value stored in the register B, that is, B=B−1.

Step 8: If the value stored in the register R6 is greater than the value stored in the register R2, the value stored in the register R2 is subtracted from the value stored in the register R6 to renew the value stored in the register R6.

Setp 9: Add '1' into the quotient to be stored in the register R0.

Step 10: Count down the counting value.

Step 11: Judge whether the registers R1 and R0 have been shifted 16 times according to the counting value. If B=0, it means that the operation have been completed, if not, the operation will return to step 3 to clear the carry flag C.

In the conventional method for dividing the 16-bit number by the 8-bit number, the total bit shifting for R1, R0 and R6 is 24 bits, that is, the number of bit shift is up to 24*16=384 times. Although the conventional method has a simple design, it does not take the operation speed into consideration. Due to the frequent bit shifting operation, the conventional dividing method can not meet the requirement of high speed, e.g. voice processing.

SUMMARY OF THE INVENTION

An object of the present invention is to provide a dividing method for the long bit division in the microprocessor to improve the speed performance by way of reducing the total bit shifting times.

The present invention is used for dividing a dividend by a divisor and finding a dividing quotient and a dividing remainder. The dividend have a low byte part and a high byte part and the divisor have a low byte part and a maximum digital value whose most significant bit is "1" and other bits are "0". At first, the low byte part of the dividend is divided by the divisor to obtain a low-byte quotient and a low-byte remainder. Secondly, the high byte part of the dividend is divided by the divisor to obtain a high-byte quotient and a high-byte remainder. Then the high-byte remainder is shift-divided by the divisor to update the low-byte quotient, the high-byte quotient, and the high-byte remainder. Then the high-byte remainder is added to the low-byte remainder to obtain a sum. the sum is divided by the divisor to obtain a quotient and the dividing remainder. Finally, the quotient is added to the low-byte quotient to find the dividing quotient.

The quotient is added to the low-byte quotient to obtain a low byte part of the dividing quotient and the high-byte quotient is a high byte part of the dividing quotient.

A first carry is added to the high-byte quotient to obtain the high byte part of the dividing quotient when adding the quotient to the low-byte quotient produces the first carry. The dividing remainder has a low byte part.

The shift-dividing have following steps. At first an inititial value is set for a counting value. Secondly, the high-byte remainder is leftwardly shifted one bit to obtain a number. Then, the divisor is substracted from the number to update the high-byte remainder and the counting value is added to the low-byte quotient to update the high-byte quotient when the number is not less than the divisor. The counter is circularly and rightwardly shifting one bit. Finally, the step that the high-byte remainder is leftwardly shifted one bit is repeated until the counting value returns to the initital value.

Furthermore, a second carry is added to the high-byte quotient to update the high-byte quotient when adding the counting value to the low-byte quotient produces the second carry. The initial value of the counting value is "10000000".

The dividing method will be stoped when the high byte part of the dividend is equal to zero.

The low-byte remainder is the dividing remainder, the low-byte quotient is a low byte part of the dividing quotient, and a high byte part of the dividing quotient is equal to zero.

The dividing method further includes a step of stoping the dividing method when the high-byte remainder is equal to zero.

The low-byte remainder is the dividing remainder, the low-byte quotient is a low byte part of the dividing quotient, and the high-byte quotient is a high byte part of the dividing quotient. The maximum digital value of the divisor is "0000000".

The present invention may best be understood throuth the following description with reference to the accompanying drawings, in which:

DETAILED DESCRIPTION OF THE PREFERRED EMBODIMENT

Figure 1:
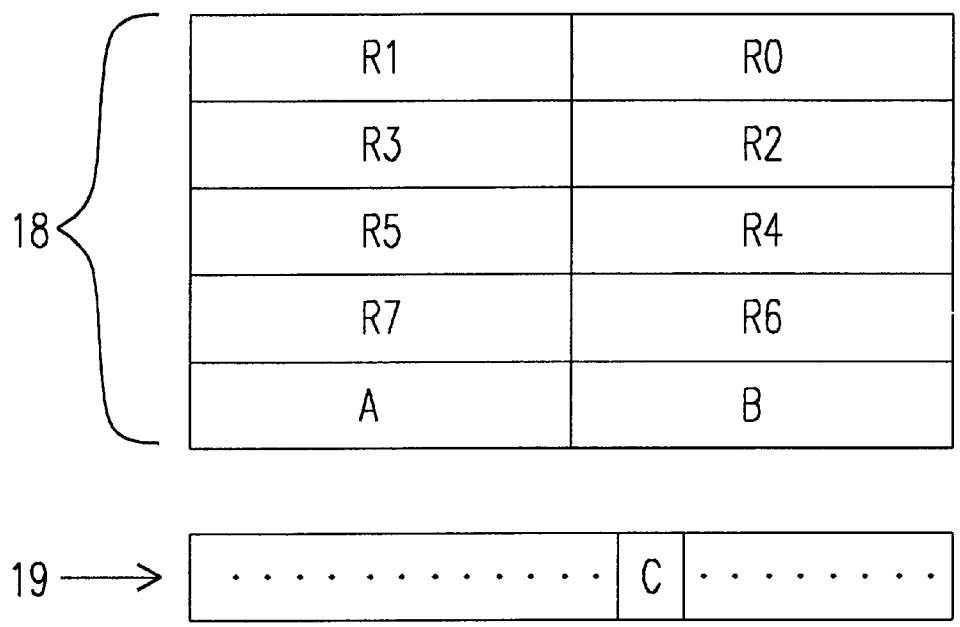
FIG. 1 is a schematic diagram shawing the registers of the 8051 microprocesso
Figure 2:
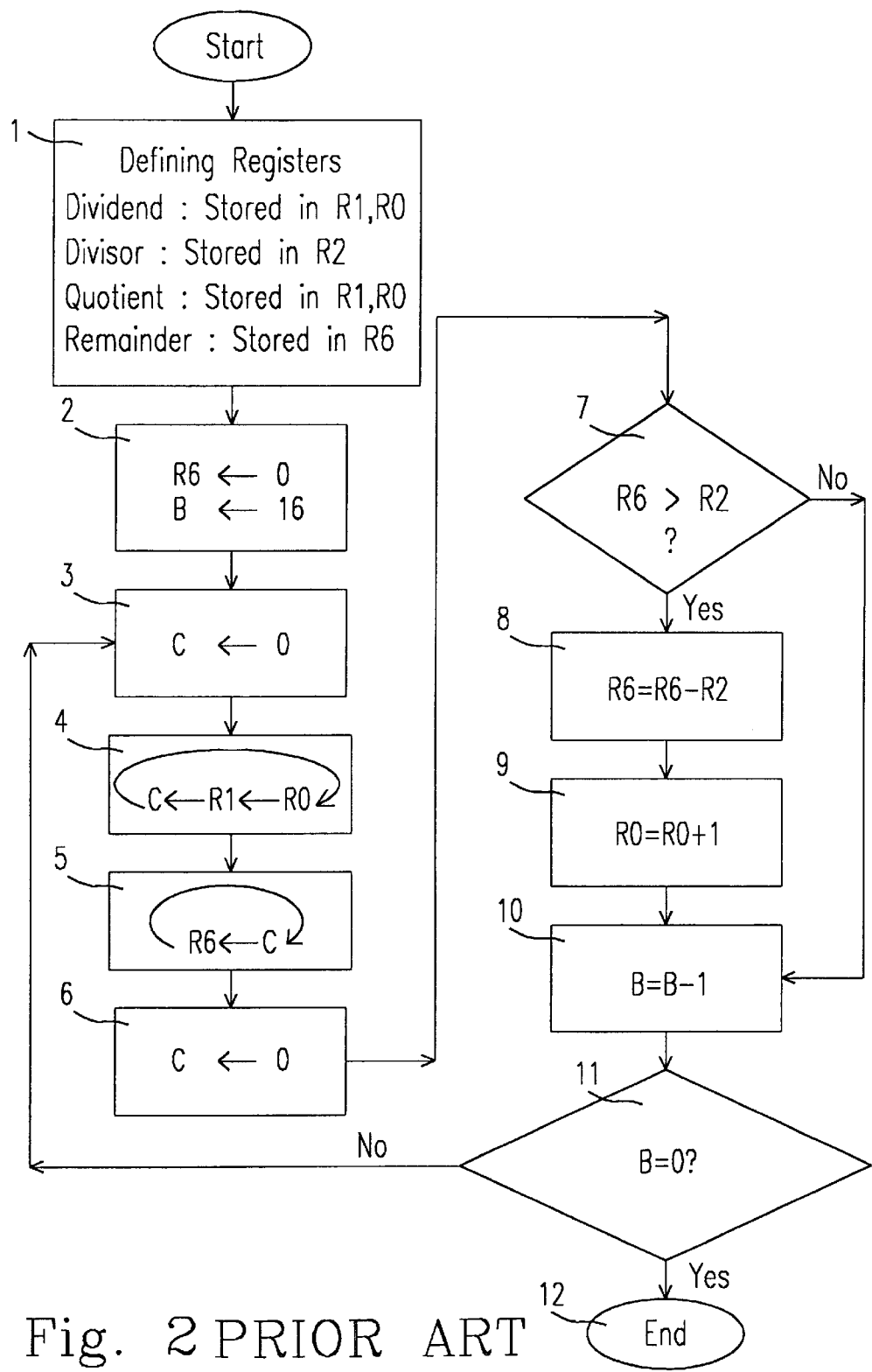
FIG. 2 is a flow chart of the conventional long bit dividing method for the conventional 8051 microprocessor.
Figure 3:
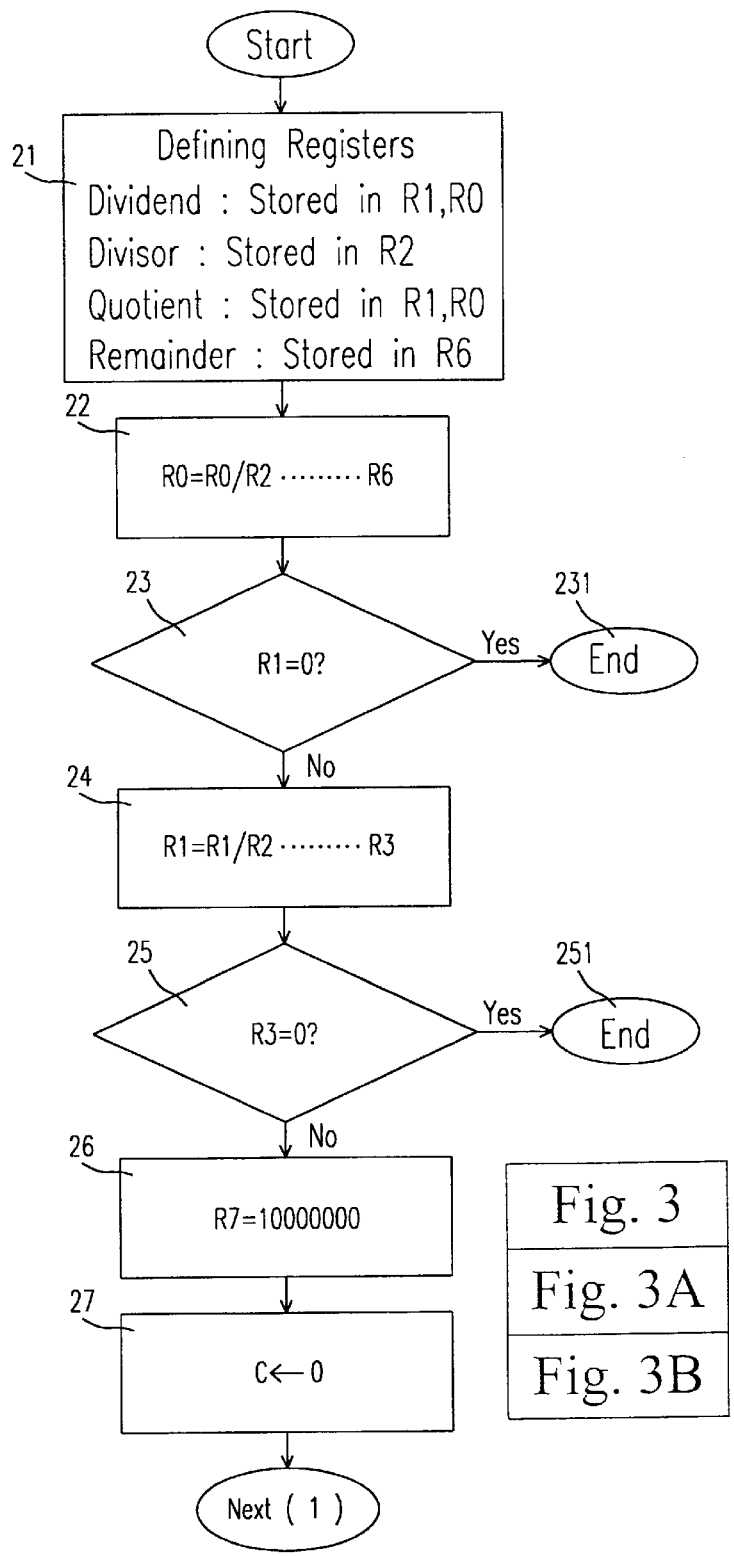
FIG. 3 is a schematic diagram showing a preferred embodiment of a long bit dividing method according to the present invention.
Figure 3A:
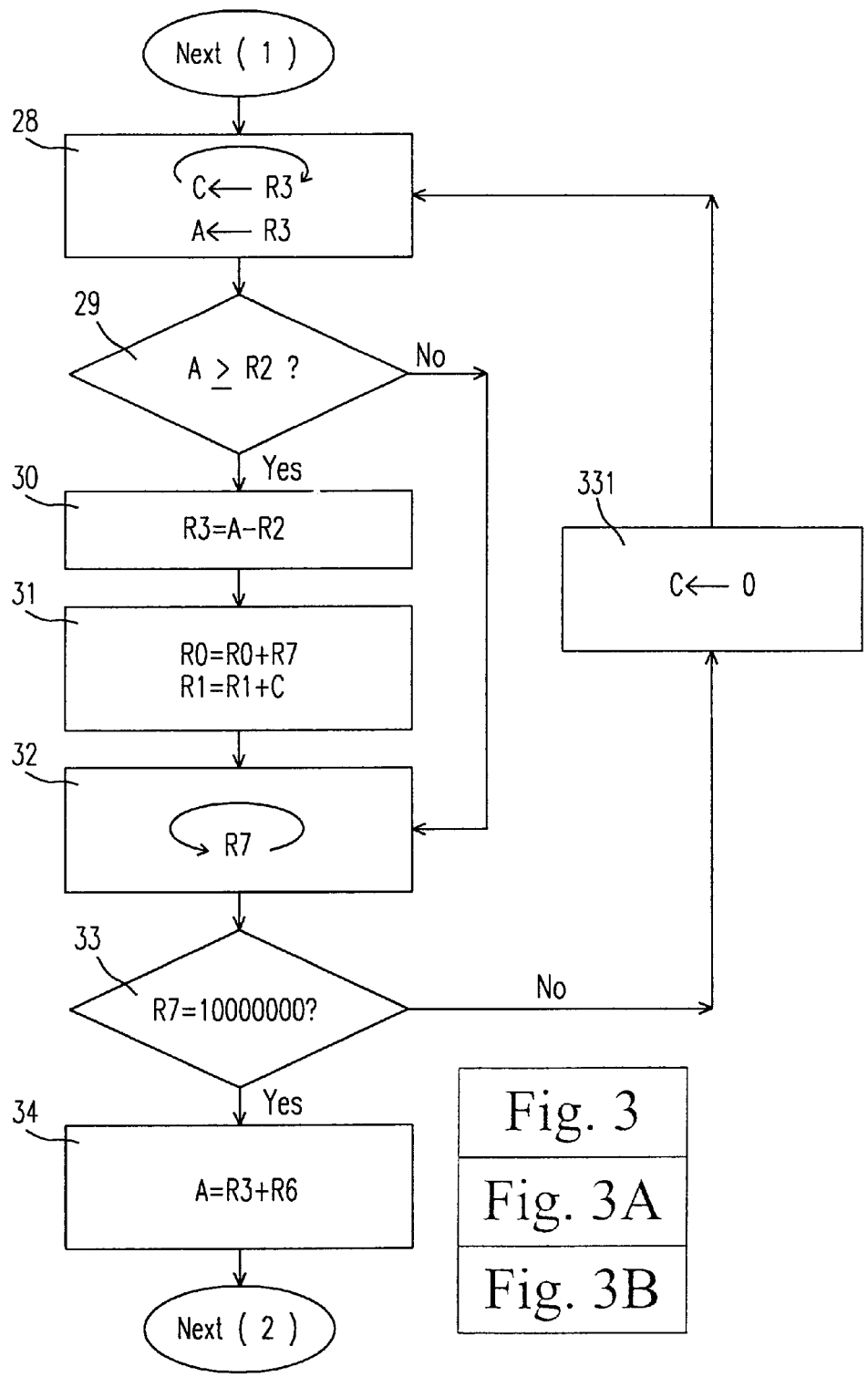
Figure 3B:
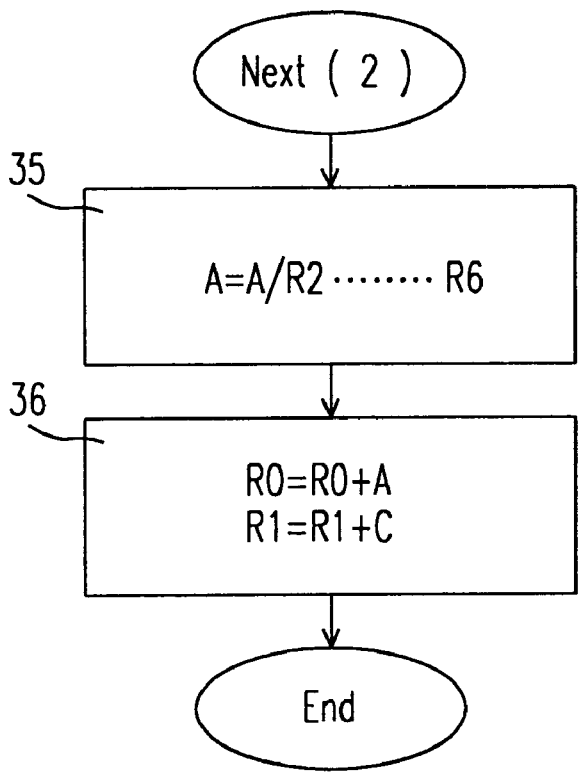

Please refer to FIG. 3 showing a preferred embodiment of the method for dividing a 16 bits number by a 8 bits number according to the present invention. The detailed steps for this method are described as follows.

Step 21: The high byte part and low byte part of a dividend are stored in the register2 R1 and R0 respectively and a divisor, only having the low byte part is stored in the register R2 to obtain a dividing quotient having a high byte part and a low byte part, to be store in the registers R1 and R0 and a dividing remainder whose maxmium value is of 8 bits is stored in the register R6, after the dividing process.

Step 22: The low byte part of the dividend stored in the register R0 is divided by the divisor stored in the register R2 to obtain a low-byte quotient to be stored in the register R0 and a low-byte remainder to be stored in the register R6.

Step 23: To judge whether the high byte part of the dividend stored in the register R1 is zero or not. If it is equal to zero, the dividing process will stop (step 231).

Step 24: If the high byte part of the dividend stored in the register R1 in not equal to zero, it is divided by the divisor stored in the register R2 to obtain a high-byte quotient to be stored in R1 and a high-byte remainder to be stored in the register R3.

Step 25: If the high-byte remainder stored in the register, the dividing process will be terminated for saving time dump to step 251).

If the high-byte remainder is not equal to zero, the bit-level of the high-byte remainder must be greater than the low-byte remainder by 8 bits, that is, $2^8$ times. Therefore, it must be multiplied by $2^8$ and be divided again to update the high-byte remainder to obtain the bit-level equal to that of the low-byte remainder. Thereafter, these two remainders are summed to be divided by the divisor again to obtain the dividing remainder and a quotient. The quotient must be added into the low-byte quotient to obtain the low byte part of the dividing quotient. If the carry flag C is set on, that is, a first carry is added to the high-byte quotient to obtain the high byte part of the dividing quotient. If not, the high-byte quotient is the high byte part of the dividing quotient.

If the high-byte remainder is directly multiplied by $2^8$, the result may exceed 8 bits. Therefore it needs some shifting operations. Once the high-byte remainder stored in the register R3 is leftwardly shifted one bits, i.e. multiplied by 2, it is necessary to judge whether the high-byte remainder is greater than the divisor or not. If the high-byte remainder is greater than the divisor, the high-byte remainder must be subtracted by the divisor to update the dividing quotient. Due to that the high-byte quotient and low-byte quotient have been stored in the register R1 and R0, it is not proper to shift the dividend like that in the conventional method because the values stored in the registers R1 and R0 shouldn't be shifted.

Step 26: The counting value is initialized by '10000000' and is stored in the register R7. During the adjustment process, The counting value stored in the register R7 is circularly counted. Once the register R3 is leftwardly shift one bit, the register R7 is circularly and rightwardly shifted one bit until the counting value stored in the register R7 returns to the initial value '10000000'. In other words, the register R7 is used to judge whether the bit-level of the high-byte remainder is equal to that of the low-byte remainder or not.

Step 27: Before utilizing the carry flag C for shifing the register R3, the carry flag C must be returned to '0' previously.

Step 28: After the high-byte remainder stored in the register R3 is leftwardly shifted and is stored in the register A, it is necessary to judge whether the value stored in the register A is greater than the divisor stored in the register R2 or not.

Step 29: If the value stored in the register A is less than the divisor stored in the register R2, the dividing quotient stored in the register R1 and R0 is not needed to be updated and the counting value stored in the register R7 is circularly and rightwardly shifted one bit by jumping to step 32.

Step 30: The value stored in the register R3 is leftwardly shifted to obtain a number. If the number is greater than the divisor, the divisor must subtracted from the number. The number is stored in the register A and the subtraction result must be stored in the register R3 to update the high-byte remainder.

Step 31: The counting value stored in the register R7 is added to the low byte part of the dividend. When the carry flag C is set on a second carry, and then the second carry is added to the high byte part of the dividend.

In fact, the counting value stored in the register R7 represents the bit-level of the high-byte remainder. To leftwardly shift the register R3 one bit means that the bit-level is decreased one bit. Therefore, to leftwardly shifting 8 bits means that the bit-level is reduced by 8 bits when the bit-level of the high-byte remainder is equal to that of the low-byte remainder.

Step 33: If the counting value is equal to the initial value '10000000' after the register R7 is leftwardly shifted, the shift-dividing process will be stopped. If not, the carry flag C will be cleared by repeating the steps from step 331 to step 28 to proceed the next shift-dividing process.

Step 34: When the bit-level of the high-byte remainder is equal to that of the low-byte remainder, the tow remainders must be added to obtain a sum. In other words, the values stored in the register R3 and R6 must be added to be stored in the register A, i.e. A=R3+R6.

Step 35: If the sum is greater than the divisor, it is necessary to be divided again, i.e. A=A/R2, to obtain the dividing remainder to be stored in R6.if not, the sum is moved to the register R6 to obtain the dividing remainder.

Step 36: On the other hand, the quotient stored in the register A is added to the low-byte quotient and the high-byte quotient, i.e. R0=R0+A, R1=R1+C, to update the dividing quotient.

In the dividing process, the total bit shifting is relatively smaller than that of the conventional method. Here total bit shifting times is only limited by adjusting the bit-level of the high-byte remainder. There are 8 times for shifting 8 bits in the register R3. On the other hand, there 8 times required for shifting 9 bits including the carry flag C. Therefore, the total bit shifting is 8*8+8*9=136 which is quite smaller than that of the conventional method. The smaller the total number of bit shifting, the less the execution time for the dividing process.

In conclusion, the maximum value of the divisor must be '0000000' to ensure that the executing speed is faster than the conventional method. If the divisor is greater than '10000000', the adjugment is required for the program to solve the overflow problem. Certainly, the method of the present invention is also suitable for other types of microprocessors, for example, the number of 32 bits is divided by the number of 16 bits. Wherein the most significant bit of the maximum digital value of the dividend is "1" and other bits are "0".

To verify the proposed method, the micro-controller 8051 is run with the frequency 16 MHz. Values of the dividend and the divisor change from 0000H to FFFFH and 01H to 80H respectively. Therefore, the total number of the division operations is 65536*128. The results are described in the table 1:

TABLE 1

|  | total time (sec) | average time of a division ($\mu$s) | average cycle required for a division (cycles) |
| --- | --- | --- | --- |
| Conventional method | 2469 | 294.328 | 392 |
| The present invention | 1095 | 130.534 | 174 |

The results shown in Table 1 indicate that the dividing method of the present invention can save a lot of time for executing shift and dividing operation.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dividing method for dividing a dividend by a divisor and finding a dividing quotient and a dividing remainder, said dividend having a low byte part and a high byte part and said divisor having a low byte part and a maximum digital value whose most significant bit is "1" and other bits are "0", comprising steps of:
    a) dividing said low byte part of said dividend by said divisor to obtain a low-byte quotient and a low-byte remainder;
    b) dividing said high byte part of said dividend by said divisor to obtain a high-byte quotient and a high-byte remainder;
    c) shift-dividing said high-byte remainder by said divisor to update said low-byte quotient, said high-byte quotient, and said high-byte remainder;
    d) adding said high-byte remainder to said low-byte remainder to obtain a sum;
    e) dividing said sum by said divisor to obtain a quotient and said dividing remainder; and
    f) adding said quotient to said low-byte quotient to find said dividing quotient.

2. A dividing method according to claim 1 wherein in said step f) said adding said quotient to said low-byte quotient is to obtain a low byte part of said dividing quotient and said high-byte quotient is a high byte part of said dividing quotient.

3. A dividing method according to claim 2 wherein said step f) includes a step of f1) adding a first carry to said high-byte quotient to obtain said high byte part of said dividing quotient when adding said quotient to said low-byte quotient produces said first carry.

4. A dividing method according to claim 1 wherein said dividing remainder has a low byte part.

5. A dividing method according to claim 1 wherein said step (c) further includes steps of:
    c1) setting an inititial value for a counting value;

c2) leftwardly shifting said high-byte remainder one bit to obtain a number;

c3) substracting said divisor from said number to update said high-byte remainder and adding said counting value to said low-byte quotient to update said high-byte quotient when said number is not less than said divisor;

c4) circularly and rightwardly shifting said counting value one bit; and c5) repeating said step c2) until said counting value returns to said initital value.

6. A dividing method according to claim 5 wherein said step c3) further includes a step of c31) adding a second carry to said high-byte quotient to update said high-byte quotient when adding said counting value to said low-byte quotient produces said second carry.

7. A dividing method according to claim 5 wherein said initial value of said counting value is "10000000".

8. A dividing method according to claim 1 wherein said step (b) further includes a step of b1) stopping said dividing method when said high byte part of said dividend is equal to zero.

9. A dividing method according to claim 8 wherein said low-byte remainder is said dividing remainder, said low-byte quotient is a low byte part of said dividing quotient, and a high byte part of said dividing quotient is equal to zero.

10. A dividing method according to claim 1 wherein after said step b), said dividing method further includes a step of b2) stoping said dividing method when said high-byte remainder is equal to zero.

11. A dividing method according to claim 10 wherein said low-byte remainder is said dividing remainder, said low-byte quotient is a low byte part of said dividing quotient, and said high-byte quotient is a high byte part of said dividing quotient.

12. A dividing method according to claim 1 wherein said maximum digital value of said divisor is "10000000".

13. A dividing method for dividing a dividend stored in a memory unit consisting of a first register and a second register by a divisor stored in a third register and finding dividing quotient to be stored in said memory unit and a dividing remainder to be stored in a seventh register, said dividend having a maximum digital value whose most significant bit is "1" and other bits are "0", comprising steps of:

a) dividing a value stored in said first register by said divisor to obtain a quotient to be stored in said first register and a remainder to be stored in said seventh register;

b) dividing said a value stored in said second register by said divisor to obtain a quotient to be stored in said second register and a remainder to be stored in a fourth register;

c) shift-dividing said remainder stored in said fourth register by said divisor to update said quotient stored in said first register, said quotient stored in said second register, and said remainder stored in said fourth register;

d) adding said remainder stored in said fourth register to said remainder stored in said seventh register to obtain a sum;

e) dividing said sum by said divisor to obtain a quotient to be stored in a accumulator and said dividing remainder; and f) adding said quotient stored in said accumulator to said quotient stored in said first register to find said dividing quotient.

14. A dividing method according to claim 13 wherein said step f) includes a step of f1) adding a first carry to said quotient stored said second register when adding said quotient stored in said accumulator to said quotient stored in first register produces said first carry.

15. A dividing method according to claim 13 wherein said step (c) further includes steps of:

c1) setting an initital value for a counting value;

c2) leftwardly shifting said remainder stored in said fourth register one bit;

c3) substracting said divisor from said remainder stored in said fourth register and adding said counting value to said quotient stored in first register when said number is not less than said divisor;

c4) circularly and rightwardly shifting said counting value one bit; and c5) repeating said step c2) until said counting value returns to said initital value.

16. A dividing method according to claim 15 wherein said step c3) further includes a step of c31) adding a second carry to said quotient stored in second register when adding said counting value to said quotient stored first register produces said second carry.

17. A dividing method according to claim 15 wherein said initial value of said counting value is "10000000".

18. A dividing method according to claim 13 wherein said step (b) further includes a step of b1) stopping said dividing method when said dividend stored in second register is equal to zero.

19. A dividing method according to claim 13 wherein after said step b), said dividing method further includes a step of b2) stoping said dividing method when said remainder stored in fourth register is equal to zero.

20. A dividing method according to claim 13 wherein said maximum digital value of said divisor is "10000000".

* * * * *